United States Patent [19]

Ishii et al.

[11] 4,322,174

[45] Mar. 30, 1982

[54] CAM SHAFT LOCKING DEVICE FOR FUEL INJECTION PUMP

[75] Inventors: Yoshiya Ishii, Toyota; Nobuyuki Fujitani; Hiroshi Imamura, both of Kariya; Kazuyoshi Arai, Hino; Toshiaki Aoki, Nagoya, all of Japan

[73] Assignee: Nippondenso Co., Ltd., Kariya, Japan

[21] Appl. No.: 14,903

[22] Filed: Feb. 23, 1979

[30] Foreign Application Priority Data

Feb. 24, 1978 [JP] Japan .................................. 53-21359

[51] Int. Cl.3 ........................ F16B 1/00; B65D 59/00; F02M 39/00; F04B 39/00

[52] U.S. Cl. ........................................ 403/12; 403/14; 123/509; 417/313

[58] Field of Search ...................... 403/12, 13, 14, 376; 123/139 AZ, 509; 417/313

[56] References Cited

U.S. PATENT DOCUMENTS 1,640,509 8/1927 Lowe ........................... 123/139 AZ
2,329,640 9/1943 Moeller ................................. 403/13
4,190,401 2/1980 Hofmann et al. ................. 403/14 X

FOREIGN PATENT DOCUMENTS 2359110 6/1975 Fed. Rep. of Germany ........ 403/14
2438313 2/1976 Fed. Rep. of Germany ........ 403/14

*Primary Examiner*—James Kee Chi
*Attorney, Agent, or Firm*—Cushman, Darby & Cushman

[57] ABSTRACT

A device for locking a cam shaft of a fuel injection pump for an internal combustion engine including a coupling block connected to a projecting portion of the cam shaft rotatably supported by a pump body. The cam shaft locking device includes a locking pin threadably engaged in a threaded opening formed in one of a fixed member on the pump body and the coupling block, and a locking plate formed with an opening for fitting the locking pin therein secured to the other of the fixed member and the coupling block, whereby the cam shaft can be locked in an optimum rotational position.

4 Claims, 7 Drawing Figures

CAM SHAFT LOCKING DEVICE FOR FUEL INJECTION PUMP

BACKGROUND OF THE INVENTION

This invention relates to a cam shaft locking device for preventing the rotation of the cam shaft of a fuel injection pump for an internal combustion engine during the transportation of the fuel injection pump and while mounting same on the engine.

When a fuel injection pump is mounted on an engine, the cam shaft of the fuel injection pump should be connected to the crank shaft of the engine in an optimum rotational position of the cam shaft so as to obtain injection of the fuel during the appropriate stroke of the engine. In conventional fuel injection pumps, a difficulty has hitherto been encountered in maintaining the cam shaft in an optimum rotational position with respect to the pump body because the cam shaft rotates to its most stable position while being transported or mounted on the engine. To overcome this difficulty, it has hitherto been usual practice to put a mark (line) to the coupling block connected to the cam shaft and the pump body for indicating an optimum rotational position of the cam shaft. In mounting the pump on the engine, the cam shaft is rotated until these two marks accord with each other, and the coupling block is connected to the driving member of the engine, so as to thereby optimally adjust the relative positions of the cam shaft of the fuel injection pump and the crank shaft of the engine. When this process is adopted, it is necessary to bring the marks into accord with each other in mounting the fuel injection pump on the engine, making the pump mounting operation troublesome. Particularly, the fuel injection timing adjusting operation is time-consuming because the marks are sometimes hidden behind parts of the engine.

SUMMARY OF THE INVENTION

This invention has as its main object the provision of a cam shaft locking device for a fuel injection pump for an internal combustion engine which enables the cam shaft to be set at an optimum position with respect to the pump body and locked in such position, so that the cam shaft can be positively maintained in such position while the pump is transported or mounted on the engine.

Another object is to provide a cam shaft locking device for locking the cam shaft in an optimum rotational position with respect to the pump body during the transportation of the fuel injection pump or the mounting thereof on the engine, so that the connecting work of the cam shaft to the driving member of the engine in optimum relative positions can be simplified and facilitated.

According to the invention, there is provided a cam shaft locking device for a fuel injection pump of the type in which one end of the cam shaft for driving the plunger of the pump projects outwardly from the pump body and is rotatably supported thereby, and a coupling block is connected to the projecting portion of the cam shaft for connection to the engine. The cam shaft locking device comprises a locking pin threadably engaged in a threaded opening formed in one of a fixed member on the pump body and the coupling block, and a locking plate formed with an opening for fitting the locking pin therein secured to the other of the fixed member and the coupling block, whereby the cam shaft can be locked in an optimum rotational position.

DETAILED DESCRIPTION OF THE EMBODIMENTS

Figure 1:
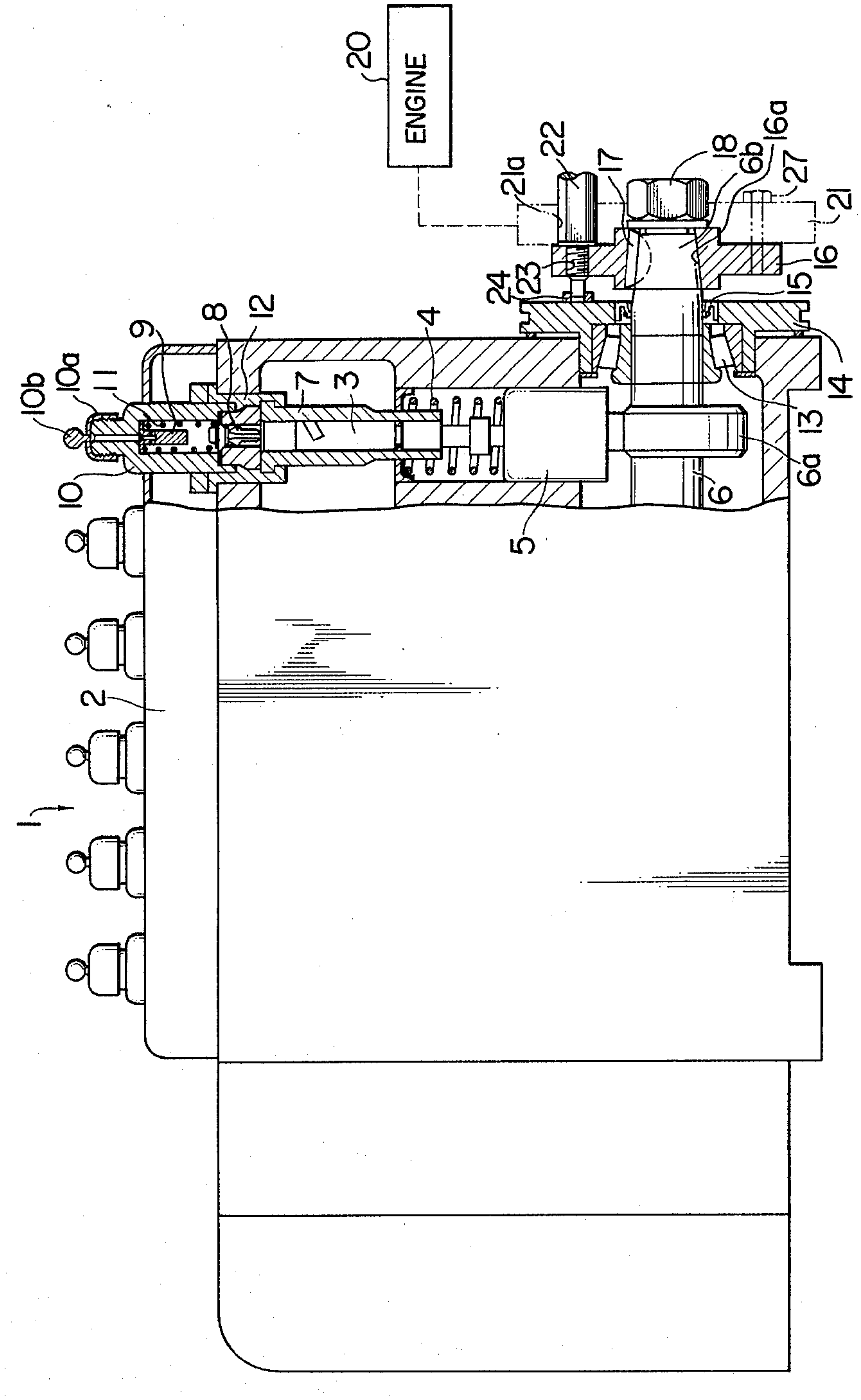
FIG. 1 is a sectional view of the essential portions of the fuel injection pump provided with the cam shaft locking device comprising one embodiment of the invention.

Preferred embodiments of the invention will now be described by referring to the drawings, in which a fuel injection pump provided with the cam shaft locking device according to the invention is shown prior to the mounting on the engine. FIGS. 1 to 4 show a first embodiment of the invention. The fuel injection pump 1 includes a fuel pressure feeding means housed in a pump body 2 and including a plunger 3 urged against a tappet 5 by the biasing force of a spring 4, so that the tappet 5 is forced against a cam **6*a* of a cam shaft 6. The rotation of the cam shaft 6 causes the plunger 3 through the tappet 5 to move in vertical reciprocatory movement in a cylinder 7**, to thereby directly feed the fuel under pressure.

The fuel fed under pressure by the upward movement of the plunger 3 opens a delivery valve 8, passes through a cylindrical delivery valve stopper 9 to a connecting port **10*a* of a delivery valve holder 10, and flows from the connecting port 10*a* to the injection nozzle of the engine through a high pressure fuel line, not shown. 10*b* designates a cap for sealing the connecting port 10*a*. 11 designates a spring for determining the pressure for opening the delivery valve 8, and 12 designates an element holder for supporting in the pump body 2 a pump element composed of the plunger 3 and cylinder 7**.

Figure 2:
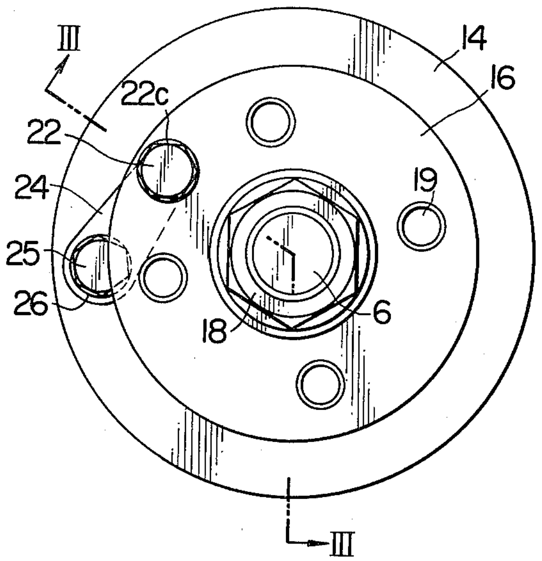
FIG. 2 is a plan view of the coupling block.

The cam shaft 6 is rotatably journalled on the pump body 2 through a bearing 13 mounted on a bearing cover 14 and has one end portion extending outwardly from the pump body 2 and formed with a tapering portion **6*b*. The bearing cover 14 is secured to the pump body 2 by bolts, not shown, and serves as a fixed member on the pump body 2 in this embodiment. An oil seal 15 is mounted between the bearing cover 14 and cam shaft 6. A coupling block 16 of a substantially discal shape formed in its center with a tapering hole 16*a* is fitted over the tapering portion 6*b* of the cam shaft 6 so that the tapering portion 6*b* extends through the tapering hole 16*a*, and secured to the cam shaft 6 by a woodruff key 17 to prevent the rotation of the coupling block 16 relative to the cam shaft 6. At the same time, a nut 18 is threaded into the forward end of the cam shaft 6 to urge the coupling block 16 to move leftwardly to be secured to the cam shaft 6. As shown in FIG. 2, the coupling block 16 is formed at its outer marginal portion with four threaded openings 19 disposed substantially equidistantly circumferentially of the block 16 for connecting to the coupling block 16 a drive gear 21 (driving member) connected to a crank shaft, not shown, of an engine 20. When the fuel injection pump 1 is mounted on the engine 20, bolts 27 are threaded into the threaded openings 19 for connecting the coupling block 16 to the drive gear 21**.

Figure 3:
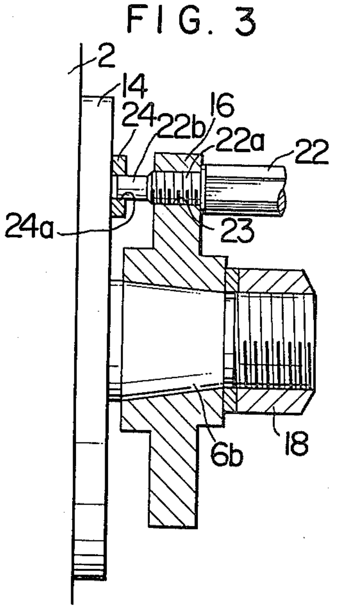
FIG. 3 is a sectional view taken along the line III—III in FIG. 2.
Figure 4:
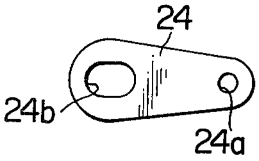
FIG. 4 is a plan view of the locking plate of the cam shaft locking device shown in FIG. 1.

22 Designates a locking pin according to the invention including a threaded portion 22*a*, a forward end portion 22*b* of a minor diameter, and a hexagonal head 22*c*. 23 designates a threaded opening formed in the coupling block 16 separately from the threaded openings 19 as shown in FIG. 3 for threadably receiving the locking pin therein. 24 designate a locking plate, shaped as shown in FIG. 4, formed therein with an opening 24*a* for intimately fitting the forward end portion 22*b* of the locking pin 22, and a slot 24*b* for permitting a locking plate fixing bolt 25 to extend therethrough. In this embodiment, the opening 24*a* serves as a locking pin fitting guide. The bolt 25 is inserted in the slot 24*b* through a flat washer or spring washer 26 and threaded into a threaded opening, not shown, formed in the bearing cover 14, thereby fastening the locking plate 24 to the bearing cover 14.

The process for locking the cam shaft 6 by using the cam shaft locking device constructed as aforementioned will be described. Prior to fastening the coupling block 16 to the tapering portion 6*b* of the cam shaft 6, the locking plate 24 is assembled with the bearing cover 14 by means of the bolt 25, and then the coupling block 16 is fastened to the tapering portion 6*b* of the cam shaft 6 by means of the woodruff key 17 and nut 18.

Then, the fuel injection pump 1 is atached to a testing apparatus and operated to effect adjustments of the injection timing. A mark (a notch, for example) is put to a suitable position on the outer circumferential surface of the coupling block 16 and a position on the bearing cover 14 corresponding to the position of the mark on the coupling block 16, when a predetermined optimum injecting timing is obtained.

The threaded portion 22*a* of the locking pin 22 is threadably engaged in the threaded opening 23 in the coupling block 16 while keeping the marks on the coupling block 16 and bearing cover 14 in accord with each other, and the forward end portion 22*b* of the locking pin 22 is fitted in the opening 24*a* in the locking plate 24. The position of the locking pin 22 relative to the bearing cover 14 may be slightly displaced due to dimensional errors in the fuel injection pump. When this is the case, the bolt 25 is loosened and the position of the locking plate 24 is adjusted by moving the bolt 25 in the slot 24*b*, thereby accommodating the displacement of the locking pin 22 and enabling the forward end portion 22*b* of the locking pin 22 to be fitted in the opening 24*a* in the locking plate 24 in spite of the dimensional errors. The length of the locking pin 22 is selected such that the forward end portion 22*b* does not come into contact with the bearing cover 14 when inserted in the opening 24*a* (See FIG. 3), so that no clamping force is exerted on the coupling block 16 by the threading of the locking pin 22 into the threaded opening 23.

After ascertaining that the forward end portion 22*b* of the locking pin 22 is fitted in the opening 24*a* in the locking plate 24, the locking plate 24 is tightly fastened to the bearing cover 14 by means of the bolt 25.

By the aforementioned process, the cam shaft 6 and the coupling block 16 are rendered unitary, so that the cam shaft 6 can be fixed to the pump body 2 in an optimum rotational position.

Therefore, by transporting or storing the fuel injection pump 1 in the aforesaid condition, it is possible to prevent the rotation of the cam shaft 6 during transportation and storing and avoid the displacement of the cam shaft 6 from its optimum rotational position.

In connecting the coupling block 16 to the drive gear 21 as the fuel injection pump 1 is mounted on the engine 20, the locking pin 22 is inserted in a locking pin receiving opening 21*a* in the drive gear 21 to bring the coupling block 16 into contact with the drive gear 21, and the bolts 27 are threadably engaged in the threaded openings 19 in the coupling block 16 as shown in FIG. 1, thereby fastening the drive gear 21 to the coupling block 16 in optimum rotational position relationship.

Thereafter, the locking pin 22 is removed from the coupling block 16 to unlock the cam shaft 6.

Figure 7:
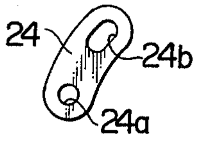
FIG. 7 is a plan view of the locking plate of the cam shaft locking device shown in FIG. 5.
Figure 5:
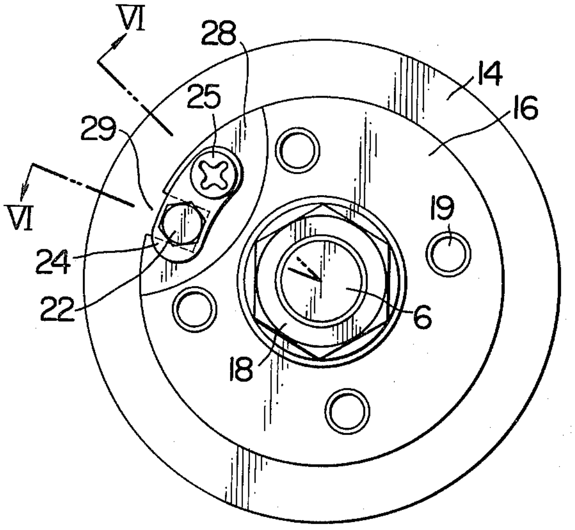
FIG. 5 is a plan view of the coupling block shown with the cam shaft locking device comprising another embodiment of the invention.
Figure 6:
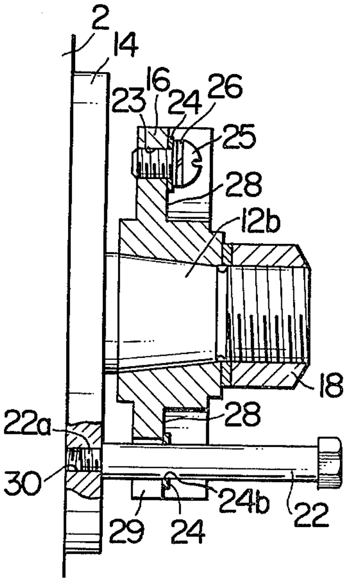
FIG. 6 is a sectional view taken along the line VI—VI in FIG. 5.

FIGS. 5 to 7 show another embodiment of the invention in which the locking plate 24 is fastened to the coupling block 16. The coupling block 16 is formed by machining in a portion of its outer marginal portion a small thickness portion 28 of an arcuate shape in a position which does not overlap the positions of the threaded openings 19. Formed in the arcuate small thickness portion 28 are the threaded opening 23 and a cutout 29, so that the threaded opening 23 will threadably receive therein the fastening bolt 25 inserted into the slot 24*b* in the locking plate 24 through the flat washer or spring washer 26, thereby assembling the locking plate 24 with the small thickness portion 28 of the coupling block 16. Then, the locking pin 22 is inserted into the opening 24*a* in the locking plate 24 and the cutout 29 in the small thickness portion 28, so that the threaded forward end portion 22*a* will be threadably engaged in a threaded opening 30 in the bearing cover 14. Thereafter, the bolt 25 is tightened to fix the locking plate 24 in place. In this way, the cam shaft 6 can be fixed in an optimum rotational position. Other operation than that described above is similar to that performed in the embodiment described by referring to FIGS. 1 to 4. According to the embodiment described by referring to FIGS. 5 to 7 too, it is possible to accommodate the displacement of the locking pin due to dimensional errors by adjusting the position of the bolt 25 in the slot 24*b* in the locking plate 24.

In the two embodiments shown and described hereinabove, the bearing cover 14 is used as a fixed member on the pump body 2. However, in case the bearing cover 14 is not juxtaposed against the coupling block 16, it is to be understood that the pump body 2 itself or any other accessory on the pump body 2 may be used as a fixed member for locking the cam shaft 6.

It is also to be understood that the driving member of the engine 20 is not limited to the drive gear 21, and that a driving pulley may also be utilized.

In the embodiment shown in FIGS. 1 to 4, the opening 24*a* is not necessarily be a through hole and may be in the form of a recess.

According to the embodiment shown in FIGS. 1 to 4, the cam shaft 6 of the fuel injection pump 1 can be readily fixed in place while maintaining the cam shaft 6 in its optimum rotational position. Thus, the invention can achieve the effect of greatly simplifying and facilitating the mounting of the fuel injection pump 1 on the engine 20 because the need to follow the time consuming step of bringing the marks into accord with each other in setting the cam shaft at its optimum rotational position when the pump is mounted on the engine in the prior art can be eliminated. Moreover, since there is no risk of the rotational position of the cam shaft being displaced while the pump mounting operation is being performed, the invention can achieve the additional effect of increasing the degree of precision with which the pump is mounted on the engine.

The locking pin 22 according to the invention only regulates the movement of the coupling block 16 in its rotational direction, and no clamping force acts between the coupling block 16 and the pump body 2. Therefore, there is no risk of the coupling block 16 being deformed by a clamping force.

The locking pin 22 is fixed in place merely by screwing. Therefore, the locking pin 22 can be readily removed to thereby unlock the cam shaft 6 by using no special tool upon completion of mounting of the pump on the engine.

According to the embodiment shown in FIGS. 5 to 7, the additional effect can be achieved to be mounted readily the locking plate 24 in addition to the effect achieved by the embodiment shown in FIGS. 1 to 4, because the locking plate 24 can be secured to the coupling block 16 before the latter is attached to the projecting end portion of the cam shaft 6.

What is claimed is:

1. A cam shaft locking arrangement for a fuel injection pump for an internal combustion engine which includes a pump body rotatably supporting a cam shaft which has an end outside said body with a coupling block secured to the end for connection to a member driven by the engine, comprising:

a locking plate, having a recessed guide portion for snugly receiving a locking pin therein, secured to a fixed portion on the pump body for adjustment of the position of said plate relative to the body;

means defining a threaded opening in the coupling block aligned with said recessed guide portion; and a locking pin having an intermediate portion thereof threadably engaged in said threaded opening with an end thereof fitting snugly in said recessed guide portion.

2. The structure defined in claim 1 wherein the locking plate is provided with a slot for insertion therethrough of screw means to secure the plate to the fixed portion on the pump body while permitting adjustment of the position of said plate relative to the body.

3. A cam shaft locking arrangement for a fuel injection pump for an internal combustion engine which includes a pump body rotatably supporting a cam shaft which has an end outside the body with a coupling block secured to the end for connection to a member driven by the engine, comprising:

a locking plate, having a guide opening therethrough for snugly receiving a locking pin, secured to the coupling block for adjustment of the position of said plate relative to the block;

means defining a threaded opening in a fixed portion on the pump body aligned with said guide opening; and a locking pin snugly extending through said guide opening and with an end thereof threadably engaged in said threaded opening.

4. The structure defined in claim 3 wherein the locking plate has a slot therein for the insertion therethrough of screw means to secure the plate to the block while permitting adjustment of the position of said plate relative to the block.

* * * * *